United States Patent
Koyama et al.

(10) Patent No.: US 6,914,719 B2
(45) Date of Patent: Jul. 5, 2005

(54) LIGHT REFLECTOR

(75) Inventors: Hiroshi Koyama, Kashima-gun (JP); Tomotsugu Takahashi, Chiyoda-ku (JP)

(73) Assignee: Yupo Corporation, Tokyo (JP)

( * ) Notice: Subject to any disclaimer, the term of this patent is extended or adjusted under 35 U.S.C. 154(b) by 0 days.

(21) Appl. No.: 10/772,238

(22) Filed: Feb. 6, 2004

(65) Prior Publication Data

US 2004/0228146 A1 Nov. 18, 2004

Related U.S. Application Data

(63) Continuation of application No. PCT/JP02/08001, filed on Aug. 6, 2002.

(30) Foreign Application Priority Data

Aug. 6, 2001 (JP) ........................................ 2001-237356

(51) Int. Cl.[7] ................................................. F21V 9/06
(52) U.S. Cl. ........................ 359/361; 359/884; 349/113; 362/31; 362/296; 362/341
(58) Field of Search ................................ 359/361, 350, 359/580, 584, 599, 883, 884; 349/62, 65, 67, 113; 362/31, 296, 341

(56) References Cited

U.S. PATENT DOCUMENTS 3,502,528 A    3/1970  Yoshimura .................. 156/164
5,176,954 A  *  1/1993  Keller et al. .............. 428/317.9
5,422,175 A  *  6/1995  Ito et al. ................... 428/304.4
5,710,856 A     1/1998  Ishii et al. ................... 385/146
5,714,223 A  *  2/1998  Araki et al. ................... 428/68
6,533,440 B2   3/2003  Koyama et al. ............ 362/296

FOREIGN PATENT DOCUMENTS

| JP | 63-161029 | | 7/1988 | |
| JP | 63161029 A | * | 7/1988 | .............. C08J/5/18 |
| JP | 6-298957 | | 10/1994 | |
| JP | 7-230004 | | 8/1995 | |
| JP | 10-45930 | | 2/1998 | |
| JP | 11-174213 | | 7/1999 | |
| WO | WO 02/04996 | | 1/2002 | |

* cited by examiner

*Primary Examiner*—Thong Nguyen
*Assistant Examiner*—Arnel C. Lavarias
(74) *Attorney, Agent, or Firm*—Oblon, Spivak, McClelland, Maier & Neustadt, P.C.

(57) ABSTRACT

A light reflector formed of a biaxially-stretched film which contains a thermoplastic resin and a filler and has an opacity of at least 95%, a whiteness of at least 90%, a reflectance $R_0$ of at least 92%, and an areal draw ratio of from 22 to 80 times, wherein the color difference $\Delta E_H$, after irradiated with a metal halide lamp spaced from the light reflector by 10 cm under an environmental condition of 83° C. and a relative humidity of 50% and at an intensity of radiation of 90 mW/cm$^2$ for 10 hours, is at most 10. The reflector is free from the trouble of yellowing as in white polyester films heretofore used in reflectors and is stable against color change for a long period of time.

22 Claims, 1 Drawing Sheet

LIGHT REFLECTOR

This application is a continuation of PCT/JP02/08001 filed Aug. 6, 2002. The present application claims priority under 35 U.S.C. §119 of Japanese Patent Application No. 237356/2001 filed Aug. 6, 2001.

BACKGROUND OF THE INVENTION

1. Field of the Invention

The present invention relates to a light reflector which is deteriorated little by UV rays and which reflects light from a light source to realize high brightness.

2. Description of the Background

Backlight-type liquid-crystal displays with a built-in light source therein have been much popularized. Of such backlight-type displays, a typical structure of sidelight-type ones comprises a light waveguide with a dot print 12 on a transparent acrylic plate 13, a light reflector 11 provided on one face of the light waveguide, a diffuser 14, and a cold-cathode lamp 15 disposed adjacently on the side of the light waveguide, as in FIG. 1. The light having entered the structure from the side of the light waveguide brightens in the dot print area, and while protected from reflection and leakage by the light reflector 11, it forms uniform surface light though the diffuser 14.

In the backlight unit of the type, the light reflector acts to efficiently utilize the light from the built-in light source for image display and functions to realize the intended image display. In general, glaring mirror reflection is disliked, and it is necessary to realize relatively uniform brightness in the plane direction in a mode of scattering reflection that gives a natural feel to viewers. In particular, the reflector used in sidelight-type liquid-crystal displays is required to reflect the light having passed through the back of the light waveguide, uniformly in the plane direction with no uneven brightness.

Heretofore, white polyester films as in JP-A 4-239540 have been much used for the application as herein.

However, some part near to the light source may be heated up to 80° C. or higher by the heat generated by the light from the light source, and, in addition, the reflector may be yellowed by the light, essentially by UV rays of the light from the light source, and it often causes color change and brightness reduction with time.

In consideration of the related art as above, an object of the present invention is to provide a reflector that is free from the trouble of yellowing as in white polyester films heretofore used in reflectors and is stable against color change for a long period of time.

SUMMARY OF THE INVENTION

We, the present inventors have assiduously studied and, as a result, have found that, when various conditions of opacity, whiteness, reflectance, areal draw radio and color difference $\Delta E_H$ after light irradiation test of an optical reflector are controlled to fall within specific ranges, then the optical reflector may attain the intended effect. On the basis of this finding, we have achieved the present invention.

Specifically, the invention provides a light reflector formed of a biaxially-stretched film which contains a thermoplastic resin and a filler and has an opacity of at least 95%, a whiteness of at least 90%, a reflectance $R_0$ of at least 92%, and an areal draw ratio of from 22 to 80 times, wherein the color difference $\Delta E_H$, after irradiated with a metal halide lamp spaced from the light reflector by 10 cm under an environmental condition of 83° C. and a relative humidity of 50% and at an intensity of radiation of 90 mW/cm² for 10 hours, is at most 10.

Preferably, the reflectance $R_0$ of the light reflector of the invention is at least 92%. Also preferably, the reflectance difference $\Delta R$ of the light reflector before and after light irradiation for 10 hours, calculated according to the following formula (1), is at most 10%. Also preferably, no crack is found in the surface of the light reflector after light irradiation for 10 hours.

$$\Delta R = R_0 - R_1 \tag{1}$$

In the formula, $R_0$ indicates the reflectance of the light reflector before irradiation for 10 hours, and $R_1$ indicates the reflectance thereof after irradiation for 10 hours.

Preferably, the porosity, calculated according to the following formula (2), of the biaxially-stretched film to form the light reflector of the invention falls between 15 and 60%.

$$\text{Porosity } (\%) = [(\rho_0 - \rho)/\rho_0] \times 100 \tag{2}$$

In the formula, $\rho_0$ indicates the true density and $\rho$ indicates the density of the stretched film.

Also preferably, the biaxially-stretched film to form the light reflector of the invention has a substrate layer (A) and a surface layer (B) on at least one face of the substrate layer (A), and the substrate layer (A) contains from 0.5 to 62% by weight of a UV-absorbing filler and the surface layer (B) contains less than 1% by weight thereof. Also preferably, the mean particle size of an inorganic filler in the substrate layer (A) or the mean dispersed particle size of an organic filler therein is from 0.1 μm to less than 1.5 μm.

BEST MODE FOR CARRYING OUT THE INVENTION

Figure 1:
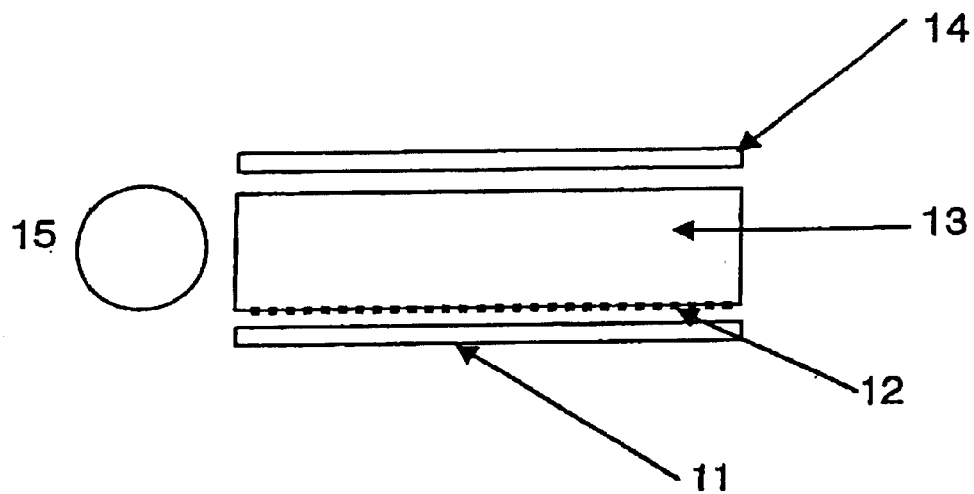
FIG. 1 is a cross-sectional view of a sidelight-type liquid-crystal display. In this, 11 is a light reflector, 12 is a white dot print for reflection, 13 is an acrylic plate (light waveguide), 14 is a diffuser sheet, 15 is a cathode-ray lamp.
Figure 2:
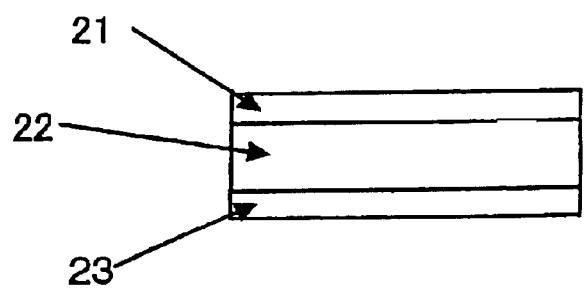
FIG. 2 is a cross-sectional view of the light reflector of Example 1. In this, 21 is a surface layer (B), 22 is a substrate layer (A), and 23 is a back layer (C).

The light reflector of the invention is described in detail hereinunder. In this description, the numerical range expressed by the wording "a number to another number" means the range that falls between the former number indicating the lowermost limit of the range and the latter number indicating the uppermost limit thereof.

The type of the thermoplastic resin for the light reflector of the invention is not specifically defined. For example, it includes ethylene-based resin such as high-density polyethylene, middle-density polyethylene; olefin-based resins such as propylene-based resin, polymethyl-1-pentene, ethylene-cyclic olefin copolymer; polyamide-based resin such as nylon-6, nylon-6,6, nylon-6,10, nylon-6,12; and polyethylene terephthalate and its copolymer, polycarbonate, atactic polystyrene, syndiotactic polystyrene, polyphenylene sulfide. Two or more of these may be combined for use herein. Of those, preferred are olefin-based resins. Of olefin-based resins, more preferred are propylene-based resin and high-density polyethylene in view of their cost, waterproofness and chemical resistance; and even more preferred is propylene-based resin.

The propylene-based resin usable herein includes propylene homopolymer, isotactic or syndiotactic polypropylene or polypropylene of other stereospecificity; and propylene-based copolymer with any other α-olefin such as ethylene, butene-1, hexene-1, heptene-1,4-methylpentene-1. The copolymer may be binary, ternary or quaternary one, and may be random copolymer or block copolymer. When such a propylene-based resin is used herein, it is preferably combined with from 3 to 25% by weight of any other thermoplastic resin the melting of which point is lower than that of the propylene-based resin, such as polyethylene, polystyrene or ethylene-vinyl acetate copolymer, for improving the stretchability of the resin film.

Preferably, the thermoplastic resin content of the biaxially-stretched film is from 38 to 91.5% by weight, more preferably from 44 to 89% by weight, even more preferably from 50 to 86% by weight.

The filler to be combined with the thermoplastic resin may be any of various inorganic fillers or organic fillers.

Preferably, the content of the inorganic filler or the organic filler to be in the biaxially-stretched film is from 8.5 to 62% by weight, more preferably from 11 to 56% by weight, even more preferably from 14 to 50% by weight.

The inorganic filler includes calcium carbonate, calcined clay, silica, diatomaceous earth, talc, barium sulfate, alumina, UV-absorbing filler. The UV-absorbing filler includes titanium dioxide and zinc oxide.

The organic filler has a melting point (for example, falling between 120 and 300° C.) or a glass transition point (for example, falling between 120 and 280° C.) higher than the melting point of polyolefin-based resin, and it includes polyethylene terephthalate, polybutylene terephthalate, polycarbonate, nylon-6, nylon-6,6, cyclic olefin polymer, cyclic olefin-ethylene copolymer.

Either singly or as combined, one or more selected from the above-mentioned inorganic filler and organic filler may be in the biaxially-stretched film. When two or more are selected and combined to be in the film, organic filler and inorganic filler may be combined.

For making the reflector of the invention has desired light-reflecting characteristics, it is desirable that a large number of uniform, nearly complete round and fine pores are formed in the biaxially-stretched film.

For suitably controlling the size of the pores to be formed in the film that is stretched in the manner mentioned hereinunder, it is desirable that the mean particle size of the inorganic filler or the mean dispersed particle size of the organic filler to be in the substrate layer (A) is from 0.1 μm to less than 1.5 μm, more preferably from 0.15 to 1.4 μm, even more preferably from 0.2 to 1.3 μm. If the mean particle size or the mean dispersed particle size is 1.5 μm or more, then the pores in the film may be non-uniform. If the mean particle size or the mean dispersed particle size is smaller than 0.1 μm, then the film could not have predetermined pores.

For suitably controlling the porosity of the film that is stretched in the manner mentioned hereinunder, it is desirable that the filler content by volume of the biaxially-stretched film is from 3.0 to 35% by volume, more preferably from 4.0 to 30% by volume. If the filler content is smaller than 3.0% by volume, then the film could not have a satisfactory number of pores. If the filler content is larger than 35% by volume, then the stiffness of the film will be poor and the film may be readily folded and wrinkled.

The biaxially-stretched film to be used in the invention may have a single-layer structure or a laminate structure of two or more layers. One example of the laminate structure comprises a substrate layer (A) and a surface layer (B) formed on at least one face of the substrate layer (A). The method of lamination for the film is not specifically limited, and any known lamination method may be employed. For example, resin melts from multiple extruders may be laminated in one die by the use of a feed block or a multi-manifold (coextrusion), or may be laminated in a mode of melt extrusion lamination, or may be laminated in a mode of dry lamination with adhesive. For example, when the multi-layered film has a three-layered structure of surface layer (B)/substrate layer (A)/back layer (C), then the substrate layer (A) may contain a UV-absorbing filler and the filler content is preferably from 0.5 to 62% by weight, more preferably from 3.5 to 50% by weight, even more preferably from 4 to 35% by weight. At least the surface layer (B) may contain a UV-absorbing filler and the filler content may be smaller than 1% by weight, preferably from 0.1 to 0.9% by weight. If the UV-absorbing filler content of the substrate layer (A) is over 62% by weight, then it may have some negative influence on the whiteness of the light reflector and may lower the brightness thereof, and if so, in addition, the film may be readily cut while stretched biaxially.

For forming the desired pores in the film, it is effective to use, for example, an inorganic filler that does not contain particles having a specific surface area of 20,000 cm²/g or more and a particle size of 10 μm or more, at least in the substrate layer (A). For the inorganic filler, especially preferred is calcium carbonate that satisfies the requirement and has a sharp particle size distribution profile.

The thickness of the surface layer and the back layer may be at least 0.1 μm, preferably from 0.1 μm to less than 1.5 μm, and is smaller than 15% of the overall thickness of the light reflector, preferably from 0.2 to 10%, more preferably from 0.5 to 5% thereof.

The biaxially-stretched film for the reflector of the invention may contain, if desired, a fluorescent brightener, a stabilizer, a light stabilizer, a dispersant, a lubricant. The stabilizer may be a sterin-hindered phenol-type, or phosphorus-containing, or amine-type stabilizer, and its content maybe from 0.001 to 1% by weight. The light stabilizer may be a steric-hindered amine-type, or benzotriazole-type, or benzophenone-type light stabilizer, and its content may be from 0.001 to 1% by weight. The inorganic filler dispereant may be a silane-coupling agent, a higher fatty acid such as oleic acid or stearic acid, metal soap, polyacrylic acid, polymethacrylic acid or their salt, and its content may be from 0.01 to 4% by weight.

For shaping the composition that contains the thermoplastic resin and the filler, employable is any ordinary biaxially-stretching method. Specifically, herein employable is a biaxial-stretching method that comprises sheetwise extruding resin melt(s) through a single-layered or multi-layered T-die or I-die connected to a screw extruder, and then biaxially stretching the resulting sheet in a combined mode of machine-direction stretching to be attained by utilizing the peripheral speed difference between rolls and cross-direction stretching to be attained in a tenter oven or a simultaneous biaxial-stretching method to be attained by a combination of a tenter oven and a linear motor The stretching temperature is lower by 2 to 60° C. than the melting point of the thermoplastic resin used. When the resin is propylene homopolymer (melting point: 155 to 167° C.), then the stretching temperature preferably falls between 152 and 164° C.; and when the resin is high-density polyethylene (melting point; 121 to 134° C.), then the stretching temperature preferably falls between 110 and 120° C. The pulling rate for the stretching preferably falls between 20 and 350 m/min.

For suitably controlling the size of the pores to be formed in the biaxially-stretched film, it is desirable that the areal draw ratio=(machine-direction draw ratio $L_{MD}$)×(cross-direction draw ratio $L_{CD}$) of the film falls between 22 and 80 times, more preferably between 25 and 70 times, even more preferably between 28 and 60 times.

When the thermoplastic resin used is propylene-based resin and if the areal draw ratio of the resin film is smaller than 22 times, then the film will be unevenly stretched and could not give a uniformly biaxially-stretched film, and it could not have desired light-reflecting characteristics necessary for the light reflector of the invention.

For suitably controlling the aspect ratio of the pores to be formed in the biaxially-stretched film, it is desirable that the ratio of the machine-direction draw ratio $L_{MD}$ to the cross-direction draw ratio $L_{CD}$, $L_{MD}/L_{CD}$ of the film falls between 0.25 and 2.7, more preferably between 0.35 and 2.3.

If the areal draw ratio oversteps the range of from 22 to 80 times or if the ratio $L_{MD}/L_{CD}$ is outside the range of from 0.25 to 2.7, then nearly complete round fine pores may be difficult to form in the stretched film.

For suitably controlling the amount per unit volume of the pores to be in the light reflector of the invention, the porosity of the film is preferably from 3 to 60%, more preferably from 15 to 55%.

In this description, the "porosity" means the value calculated according to the above-mentioned formula (2). In formula (2), $\rho_0$ indicates the true density, and $\rho$ indicates the density of the stretched film (JIS P-8118).

So far as the non-stretched material does not contain much air, the true density is nearly equal to the density of the non-stretched film.

The density of the biaxially-stretched film for use in the invention generally falls between 0.55 and 1.20 g/cm³. Films having more pores have a smaller density and have a larger porosity. Films having a larger porosity may have improved surface-reflecting characteristics.

The thickness of the biaxially-stretched film is preferably from 40 to 400 μm, more preferably from 80 to 300 μm. If the thickness is smaller than 40 μm, then light may pass through the film to run from the back of the film. If the thickness is larger than 400 μm, then the backlight unit that comprises such a thick film will be thick.

The opacity (according to JIS P-8138) of the light reflector of the invention is at least 95%, preferably at least 97%. If it is lower than 95%, then light may pass through the reflector to run from the back thereof.

The whiteness (according to JIS L-1015) of the light reflector of the invention is at least 90%, preferably at least 95%. If is it lower than 90%, the reflector may absorb light.

One characteristic of the light reflector of the invention is that the color difference $\Delta E_H$ thereof, after irradiated with a metal halide lamp spaced from it by 10 cm under an environmental condition of 83° C. and a relative humidity of 50% and at an intensity of radiation of 90 mW/cm² for 10 hours, is at most 10. If the color difference $\Delta E_H$ is over 10, then the light reflector may be yellowed in its service environment. Preferably, the color difference $\Delta E_H$ of the light reflector of the invention is at most 5.

The "color difference $\Delta E_H$" as referred to herein is according to the Hunter's color-difference formula of JIS Z-8730, and it is calculated according to the following formula:

$$\Delta E_H = [(\Delta L)^2 + (\Delta a)^2 + (\Delta b)^2]^{1/2}$$

wherein $\Delta E_H$ indicates the color difference according to the Hunter's color-difference formula, and $\Delta L$, $\Delta a$ and $\Delta b$ each indicate the difference in the lightness index L and in the chromaticness indices a and b, respectively, between two surface colors in the Hunter's color-difference formula.

For measuring the color difference $\Delta E_H$ in this description, used is Iwasaki Electric's EYE-Super UV Tester SUV-W13. The light source, metal halide lamp for it is Iwasaki Electric's trade name, M04L21WB/SUV. The test temperature is 83° C. This is in accordance with the open air exposure condition for Yupo Corporation's synthetic paper, YUPO FPG150 (trade name) in the same device as herein.

For making the light reflector have a color difference $\Delta E_H$ of at most 10, an antioxidant may be added to the film. For the antioxidant, amine-type or phenolic antioxidants are effective. For preventing the reflector from being optically deteriorated by UV rays, it is desirable that the antioxidant of the type is combined with a phosphorus-containing antioxidant. The amount of the antioxidant to be in the reflector may be generally from 0.01 to 10 parts by weight relative to 100 parts by weight of the main ingredient, thermoplastic resin, of the stretched film.

Preferably, the light reflector of the invention has reflectance $R_0$ of at least 92%, more preferably at least 94%. If its reflectance $R_0$ is lower than 92%, then light may pass through the reflector to run from the back thereof. Also preferably, the reflectance difference $\Delta R$ of the light reflector before and after light irradiation for 10 hours is at most 10%. If it is over 10%, then the brightness of the backlight that comprises the reflector may lower after long-term use. Also preferably, no crack is found in the surface of the reflector after light irradiation for 10 hours. The excellent property of the light reflector of the invention that is resistant to deterioration by light on its surface results from the fine pores existing in the biaxially-stretched film to scatter incident light and from the UV-absorbing filler there into absorb UV rays. Regarding the refractive index of the UV-absorbing filler, for example, those of titanium dioxide and zinc oxide used in the Examples of the invention are 2.76 and 2.0, respectively, and are higher than the refractive index of an ordinary inorganic filler, calcium carbonate (1.59). Accordingly, the UV-absorbing filler used in the film for the light reflector improves the properties of the reflector, For making the light reflector of the invention have the desired light-reflecting characteristics, it is desirable that the substrate layer (A) contains such a UV-absorbing filler along with an inorganic filler (except UV-absorbing filler) and/or an organic filler. For preventing the matrix resin of the film from being deteriorated by UV rays, it is also desirable that a radical scavenger is added to the film. The radical scavenger may be a hindered amine-type light stabilizer (HALS), and its amount to be added to the film may be generally from 0.01 to 10 parts by weight relative to 100 parts by weight of thermoplastic resin, the main ingredient of the stretched film.

Both surfaces of the light reflector of the invention may be coated with a coating layer, not detracting from the intended light-reflecting characteristics of the reflector. In particular, the back face of the light reflector may be processed to have thereon a dot print of white paint for improving the light-reflecting characteristics of the reflector, and for improving the printability thereof, the back face is preferably coated with a coating layer.

The coating layer may be formed in any known manner so that its thickness may be from 0.5 to 20 μm.

The shape of the light reflector of the invention is not specifically limited, and may be suitably determined in accordance with the use and the condition in practical service thereof. In general, the light reflector is in the form of a plate or sheet. Not limited thereto, however, it may be in any other form that serves as a light reflector, and falls within the scope of the invention.

The light reflector of the invention is extremely useful as the light reflector that constitutes backlight-type, especially sidelight-type display devices. In the sidelight-type liquid-crystal display device that comprises the light reflector of the invention, the light reflector may uniformly reflect the light that has passed through the light waveguide and ensures uniform brightness of the device in the plane direction, and therefore, the display device gives a natural feel to viewers.

The light reflector of the invention is usable not only in such backlight-type liquid-crystal displays but also in any other energy-saving display devices which do not have a built-in light source and which are to reflect room light. In addition, it may also be used in any others, for example, as the backside of the light source in indoor/outdoor illuminations or electrically-lighting signs.

The invention is described more specifically with reference to the following Examples, Comparative Examples and Test Example. The materials and their amount and ratio, and the treatments mentioned below may be suitably varied, not overstepping the spirit of the invention. Accordingly, the scope of the invention should not be limited to the Examples mentioned below. The materials used in the following Examples and Comparative Examples are shown in Table 1.

EXAMPLES 1 TO 5, AND COMPARATIVE EXAMPLES 1 TO 3

A composition (A) prepared by mixing propylene homopolymer, high-density polyethylene, heavy calcium carbonate, titanium dioxide and zinc oxide in the ratio indicated in Table 2, and compositions (B) and (C) prepared by mixing propylene homopolymer, heavy calcium carbonate, titanium dioxide and zinc oxide in the ratio also indicated in Table 2 were individually melt-kneaded in separate three extruders at 250° C., then fed into one coextrusion die, so as to laminate both faces of (A) with (B) and (C) in the die and sheetwise extruded out, and then cooled with a chill roll to about 60° C. to give a laminate film.

The compositions (A), (B) and (C) each contained, as antioxidants, 0.05 parts by weight of a phenol-type stabilizer (Ciba-Geigy's trade name, Irganox 1010) and 0.05 parts by weight of a phosphorus-containing stabilizer (GE Plastics' trade name, Weston 618), and, as a radical scavenger, 0.05 parts by weight of a hindered amine-type light stabilizer (Sankyo's trade name, HA-70G), relative to 100 parts by weight of the thermoplastic resin therein.

The laminate film was again heated up to 145° C., then stretched in the machine direction in the draw ratio as in Table 2 by utilizing the difference in the peripheral speed of a number of rolls, again heated up to about 150° C., and then stretched in the cross direction in the draw ratio as in Table 2 with a tenter. Next, this was annealed at 160° C. and cooled to 60° C., and then its edges were trimmed away to give a three-layered (B/A/C) light stabilizer. The surface layer (B) is to be the surface in contact with a light waveguide when the reflector is built in a liquid-crystal display.

The light reflector of Comparative Example 1 was fabricated according to the method of Example 1 in JP-A 2001-39042, in which titanium oxide was added to both faces of the biaxially-stretched film.

The light reflector of Comparative Example 2 is the same as that of Example 2 except the following: Titanium dioxide was not used, the type of heavy calcium carbonate in the composition (A) was changed as in Table 2, and the proportion of the propylene homopolymer was varied as in Table 2.

For the light reflector of Comparative Example 3, a commercially-available white polyester film (Toray's trade name, E60L) was used.

Text Example

The light reflectors fabricated in Examples 1 to 5 and Comparative Examples 1 to 3 were analyzed for the whiteness, the opacity, the porosity, the reflectance, the color difference $\Delta E_H$ and the surface degradation, The whiteness was measured according to JIS L-1015, using a metering device (Suga Test Instruments' SM-5).

The opacity was measured according to JIS P-8138, using a metering device (Suga Test Instruments' SM-5).

The porosity was derived from the density and the true density of the stretched film measured according to JIS P-8118, in accordance with the above-mentioned formula (2).

The reflectance was measured according to JIS Z-8701, using a metering device (Hitachi's U-3310), and this is in terms of the mean reflectance of light falling within a wavelength range of from 400 nm to 700 nm.

The reflectance difference $\Delta R$ is the difference between the reflectance of the light reflector measured before light irradiation and that after light irradiation for 10 hours under the condition mentioned below, and it is calculated according to the above-mentioned formula (1).

For the color difference $\Delta E_H$, the light reflector was irradiated with a metal halide lamp spaced from it by 10 cm under an environmental condition of 83° C. and a relative humidity of 50% and at an intensity of radiation of 90 mW/cm$^2$ for 10 hours, and the color difference of the light reflector before and after light irradiation is measured by the use of the above-mentioned metering device.

Regarding the surface degradation of the light reflector, the surface thereof after irradiation with light for 10 hours was evaluated according to the following criteria:

○: The entire surface of the light reflector did not change even after the test, and no surface crack was found.

x: The entire surface of the light reflector cracked after the test.

The test results are all given in Table 3.

TABLE 1

| Material | Details |
| --- | --- |
| Propylene Homopolymer (PP1) | propylene homopolymer [Japan Polychem's Novetec PP: MA4] (MFR (230° C., 2.16 kg load) = 5 g/10 min) |
| Propylene Homopolymer (PP2) | propylene homopolymer [Japan Polychem's Novatec PP: MA3] (MFR (230° C., 2.16 kg load) = 11 g/10 min) |
| High-Density Polyethylene (HDPE) | high-density polyethylene [Japan Polychem's Novatec HD: HJ360] (MFR (190° C., 2.16 kg load) = 5.5 g/10 min) |

TABLE 1-continued

| Material | Details |
|---|---|
| $CaCO_3$ (a) | heavy calcium carbonate [Maruo Calcium's Caltex 5], having a mean particle size of 0.93 μm and a specific surface area of 25,000 cm$^2$/g, but not containing particles of 5 μm or more in size |
| $CaCO_3$ (b) | heavy calcium carbonate [Shiraishl Calcium's Softon 1800], having a mean article size of 1.5 μm and 14,800 cm$^2$/g |
| $CaCO_3$ (c) | heavy calcium carbonate [Maruo Calcium's Caltex 7], having a mean particle size of 0.97 μm and a specific surface area of 23,000 cm$^2$/g, but not containing particles of 7 μm or more in size |
| $TiO_2$ | titanium dioxide [Ishihara Sangyo's CR60], having a mean particle size of 0.2 μm |
| ZnO | zinc oxide [Sakai Chemical industry's two products], having a mean particle size of 0.6 μm |

TABLE 2

Constitution of Light Reflector
Biaxially-Stretched Film

| | Substrate Layer (A) Composition (wt. %) | | | | | Surface Layer (B) composition (wt. %) | | | |
|---|---|---|---|---|---|---|---|---|---|
| | PP1 | HDPE | $CaCO_3$ | $TiO_2$ | ZnO | PP2 | $CaCO_3$ | $TiO_2$ | ZnO |
| Example 1 | 56 | 10 | (a)30 | 4 | 0 | 97 | (b)2.5 | 0.5 | 0 |
| Example 2 | 50 | 10 | (c)30 | 10 | 0 | 97 | (b)2.5 | 0.5 | 0 |
| Example 3 | 54 | 10 | (c)30 | 6 | 0 | 70 | (c)29.5 | 0.5 | 0 |
| Example 4 | 50 | 10 | (c)30 | 0 | 10 | 97 | (b)2.5 | 0 | 0.5 |
| Example 5 | 35 | 10 | (c)5 | 50 | 0 | 97 | (c)2.5 | 0.5 | 0 |
| Comparative Example 1 | 65 | 10 | (a)25 | 0 | 0 | 99 | 0 | 1 | 0 |
| Comparative Example 2 | 60 | 10 | (b)30 | 0 | 0 | 97.5 | (b)2.5 | 0 | 0 |
| Comparative Example 3 | white polyester film (Toray's trade name, E60L) | | | | | | | | |

Constitution of Light Reflector

| | Biaxially-Stretched Film | | | | Draw Ratio (times) | | | thickness (μm) | |
|---|---|---|---|---|---|---|---|---|---|
| | Back Layer (C) Composition (wt. %) | | | | | | | total thickness | thickness of each layer (B)/(A)/(C) |
| | PP2 | $CaCO_3$ | $TiO_2$ | ZnO | area | MD | CD | | |
| Example 1 | 100 | 0 | 0 | 0 | 44.6 | 4.8 | 9.3 | 150 | 0.5/149/0.5 |
| Example 2 | 97 | (b)2.5 | 0.5 | 0 | 35.7 | 4.2 | 8.5 | 170 | 0.5/169/0.5 |
| Example 3 | 70 | (c)29.5 | 0.5 | 0 | 31.2 | 3.8 | 8.2 | 170 | 0.5/169/0.5 |
| Example 4 | 97 | (b)2.5 | 0 | 0.5 | 35.7 | 4.2 | 8.5 | 170 | 0.5/169/0.5 |
| Example 5 | 97 | (c)2.5 | 0.5 | 0 | 35.7 | 4.2 | 8.5 | 170 | 0.5/169/0.5 |
| Comparative Example 1 | 100 | 0 | 0 | 0 | 42.5 | 5.0 | 8.5 | 60 | 3/56/1 |
| Comparative Example 2 | 97.5 | (b)2.5 | 0 | 0 | 35.7 | 4.2 | 8.5 | 170 | 0.5/169/0.5 |
| Comparative Example 3 | white polyester film (Toray's trade name, E60L) | | | | | | | 188 | — |

TABLE 3

Properties of Light Reflector

| | before EYE-Super Test | | | | | | | after 10 hours | | | | | | |
|---|---|---|---|---|---|---|---|---|---|---|---|---|---|---|
| | whiteness W (%) | opacity (%) | porosity (%) | reflectance $R_0$ (%) | lightness index L (%) | index a | index b | reflectance $R_1$ (%) | lightness index L (%) | index a | index b | ΔR | $ΔE_H$ | surface degradation |
| Example 1 | 97 | 98 | 35 | 95 | 97 | −0.2 | 2.0 | 95 | 98 | −0.2 | 1.9 | 0 | 0 | ○ |
| Example 2 | 97 | 100 | 40 | 96 | 98 | −0.1 | 1.6 | 96 | 97 | −0.1 | 1.6 | 0 | 0 | ○ |
| Example 3 | 98 | 100 | 43 | 96 | 98 | −0.6 | 1.4 | 96 | 98 | −0.6 | 1.4 | 0 | 0 | ○ |

TABLE 3-continued

| | Properties of Light Reflector | | | | | | | | | | | | | |
|---|---|---|---|---|---|---|---|---|---|---|---|---|---|---|
| | before EYE-Super Test | | | | | | | after 10 hours | | | | | | |
| | whiteness W (%) | opacity (%) | porosity (%) | reflectance $R_0$ (%) | lightness index L (%) | index a | index b | reflectance $R_1$ (%) | lightness index L (%) | index a | index b | ΔR | $\Delta E_H$ | surface degradation |
| Example 4 | 97 | 100 | 43 | 96 | 98 | −0.1 | 1.6 | 96 | 98 | −0.1 | 1.6 | 0 | 0 | ○ |
| Example 5 | 97 | 100 | 15 | 97 | 98 | −0.2 | 1.3 | 97 | 98 | −0.2 | 1.3 | 0 | 0 | ○ |
| Comp. Example 1 | 96 | 93 | 40 | 90 | 97 | −0.2 | 2.2 | 90 | 97 | −0.2 | 2.2 | 0 | 0 | ○ |
| Comp. Example 2 | 95 | 97 | 35 | 94 | 96 | 0.0 | 2.1 | 93 | 96 | −0.9 | 1.1 | 1 | 0 | x |
| Comp. Example 3 | 96 | 99 | − | 96 | 98 | 1.5 | −3.4 | 77 | 87 | 0.8 | 24.0 | 19 | 30 | ○ |

INDUSTRIAL APPLICABILITY

As described hereinabove, the light reflector of the invention is yellowed little in its service environment, and realizes a bright backlight that does not undergo color change for a long period of time. In addition, the invention may increase the brightness of illuminations at low costs, not relying on any optically-characteristic components.

The present disclosure relates to the subject matter contained in PCT/JP02/08001 filed Aug. 6, 2002 and Japanese Patent Application No. 237356/2001 filed Aug. 6, 2001, which are expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be by the claims set forth below.

What is claimed is:

1. A light reflector formed of a biaxially-stretched film which contains a thermoplastic resin and a filler and has an opacity of at least 95%, a whiteness of at least 90%, a reflectance $R_0$ of at least 92%, and an areal draw ratio of from 22 to 80 times, wherein the color difference $\Delta E_H$, after irradiated with a metal halide lamp spaced from the light reflector by 10 cm under an environmental condition of 83° C. and a relative humidity of 50% and at an intensity of radiation of 90 mW/cm² for 10 hours, is at most 10.

2. The light reflector according to claim 1, wherein the reflectance difference ΔR before and after the light irradiation for 10 hours, represented by the following formula, is at most 10%:

$$\Delta R = R_0 - R_1 \quad (1)$$

wherein $R_0$ indicates the reflectance of the light reflector before irradiation for 10 hours, and $R_1$ indicates the reflectance thereof after irradiation for 10 hours.

3. The light reflector according to claim 1, wherein the surface is not cracked after light irradiation for 10 hours.

4. The light reflector according to claim 1, wherein the porosity, represented by the following formula, of the biaxially-stretched film is from 3 to 60%:

$$\text{Porosity }(\%) = [(\rho_0 - \rho)/\rho_0] \times 100 \quad (2)$$

wherein $\rho_0$ indicates the true density and $\rho$ indicates the density of the stretched film.

5. The light reflector according to claim 1, wherein the biaxially-stretched film has a substrate layer (A) and a surface layer (B) formed on at least one face of the substrate layer (A).

6. The light reflector according to claim 5, wherein the substrate layer (A) contains from 0.5 to 62% by weight of a UV-absorbing filler and the surface layer (B) contains less than 1% by weight of a UV-absorbing filler.

7. The light reflector according to claim 6, wherein the substrate layer (A) contains from 0.5 to 50% by weight of a UV-absorbing filler and the surface layer (B) contains from 0.1 to 0.9% by weight of a UV-absorbing filler.

8. The light reflector according to claim 6, wherein the UV-absorbing filler is titanium dioxide or zinc oxide.

9. The light reflector according to claim 6, wherein the mean particle size of the UV-absorbing filler is from 0.1 μm to less than 1.5 μm.

10. The light reflector according to claim 5, wherein the surface layer (B) is formed on both surfaces of the substrate layer (A).

11. The light reflector according to claim 5, wherein the thickness of the surface layer (B) is from 0.1 μm to less than 1.5 μm.

12. The light reflector according to claim 5, wherein the thickness of the surface layer (B) is from 0.2 to 10% of the overall thickness of the light reflector.

13. The light reflector according to claim 5, wherein the substrate layer (A) contains an inorganic filler having a mean particle size of from 0.1 μm to less than 1.5 μm, and/or an organic filler having a mean dispersed particle size of from 0.1 μm to less than 1.5 μm.

14. The light reflector according to claim 5, wherein the substrate layer (A) contains an inorganic filler having a mean particle size of from 0.15 to 1.4 μm.

15. The light reflector according to claim 5, wherein the substrate layer (A) contains an inorganic filler having a specific surface area of at least 20,000 cm²/g.

16. The light reflector according to claim 1, wherein the ratio of the machine-direction draw ratio $L_{MD}$ to the cross-direction draw ratio $L_{CD}$, $L_{MD}/L_{CD}$, of the biaxially-stretched film falls between 0.25 and 2.7.

17. The light reflector according to claim 1, wherein the biaxially-stretched film contains from 38 to 91.5% by weight of a thermoplastic resin.

18. The light reflector according to claim 1, wherein the thermoplastic resin is a polyolefin-based resin.

19. The light reflector according to claim 1, wherein the thermoplastic resin is a propylene-based resin or high-density polyethylene.

20. The light reflector according to claim 1, which contains an antioxidant.

21. A display device having the light reflector according to claim 1.

22. A liquid-crystal display device having the light reflector according to claim 1.

* * * * *